No. 814,052.  
PATENTED MAR. 6, 1906.  
J. D. KINZER.  
ICE CREAM MOLD.  
APPLICATION FILED MAR. 20, 1905.

Witnesses  
John D. Kinzer, Inventor  
by Jacob H. Snow  
his Attorney.

UNITED STATES PATENT OFFICE.

JOHN D. KINZER, OF INDIANAPOLIS, INDIANA.

ICE-CREAM MOLD.

No. 814,052.   Specification of Letters Patent.   Patented March 6, 1906.

Application filed March 20, 1905. Serial No. 251,169.

*To all whom it may concern:*

Be it known that I, JOHN D. KINZER, a citizen of the United States, residing at Indianapolis, in the county of Marion and State of Indiana, have invented certain new and useful Improvements in Ice-Cream Molds, of which the following is a specification.

My invention relates to an improvement in ice-cream molds, and comprises in the main a sectional mold the sections of which are preferably hinged together and when open adapted to be inserted in a hopper or other device wherein they are filled with the same or different kinds of cream, after which they are withdrawn and folded together, so that the two half-molds of cream of the same or different flavors are brought together preparatory to their being removed for consumption.

It further consists in certain novel features of construction and combinations of parts, which will be hereinafter described, and pointed out in the claims.

Figure 1:
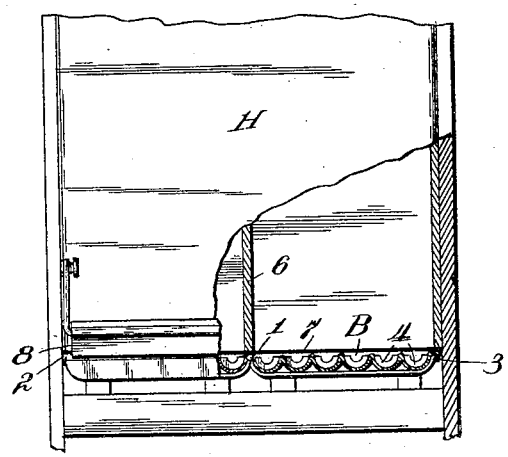
Figure 2:
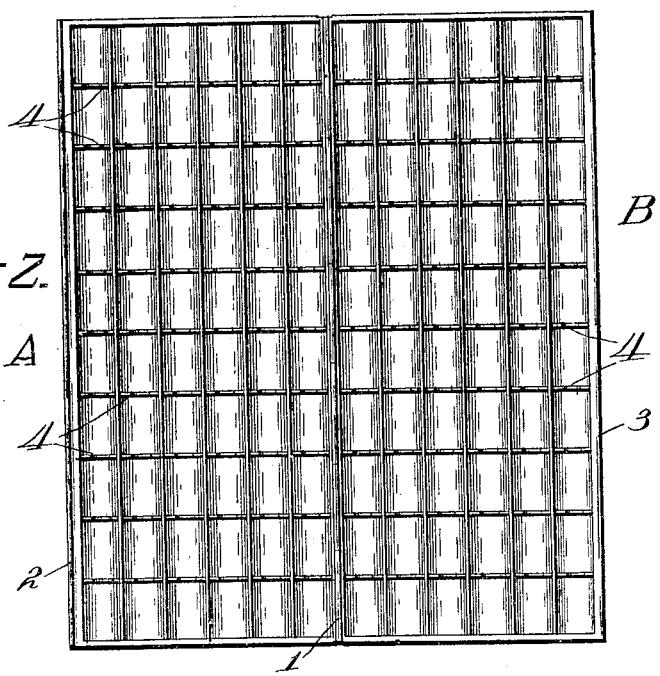
Figure 3:

In the accompanying drawings, Figure 1 is a view in elevation of the hopper with a portion of the front broken away and showing the mold in place therein. Fig. 2 is a view of the open mold, and Fig. 3 illustrates the same closed in transverse section.

A and B represent the two sections of the mold, preferably connected at adjacent edges by a hinge 1, whereby the two sections may be opened or closed. At their outer edges they are provided with flanges 2 and 3, preferably, which overlap each other.

The molds are made up of a plurality of corrugations of semicylindrical form and are so arranged and disposed that the two sections when folded together form counterparts to complete a cylindrical shape or form. This, however, is not essential and is capable of a variety of modifications to suit the requirements. In each of these corrugations partitions 4 4 are formed to facilitate breaking the cream or cutting it into small cakes or sections.

In filling the mold the cream is preferably placed in a hopper H. This hopper preferably, though not necessarily, is provided with a central partition 6 in line with the hinge 1 between the sections, the purpose of the partition being to provide two compartments in the hopper for different flavors or colors or cream and ice or what-not. An opening 7 in the bottom of the hopper is provided to receive the mold, which is slid therein with the sections opened out. Cream is then caused to fill the recesses of the mold, and as the mold is drawn out a rubber scraper 8 evens it off at the top, after which the sections are closed and the cream of the two sections is brought together to make the cylindrical forms of two different varieties of cream, if such has been selected. The cream is then removed from the mold when desired and ready for consumption.

Slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In an ice-cream mold, the combination with a partitioned hopper having an opening in its lower end, of a sectional mold, adapted to slide in and out of the opening in the hopper, the joint between sections coming beneath a partition in the hopper whereby each section of the mold is filled with a different flavored or colored cream, whereby when the mold is withdrawn, a completed block of cream is formed by folding the sections of the mold together.

2. A portable ice-cream mold comprising a partitioned or divided hopper having an opening at the lower end in one side thereof, and a sectional mold fitted to the opening, said sections counterparts of each other and capable of being superimposed when removed from the hopper to complete the blocks of material molded therein.

In testimony whereof I have affixed my signature in presence of two witnesses.

JOHN D. KINZER.

Witnesses:
J. H. SNOW,
C. P. KOCHEA.